United States Patent [19]

Bartesch et al.

[11] Patent Number: 4,600,594

[45] Date of Patent: Jul. 15, 1986

[54] PROCESS FOR THE CONDITIONING OF CRUSHED OIL-CONTAINING SEEDS PRIOR TO FLAKING

[75] Inventors: Helmut Bartesch, Ravensburg; Gerd Florin, Vorberg, both of Fed. Rep. of Germany

[73] Assignee: Escher Wyss GmbH, Ravensburg, Fed. Rep. of Germany

[21] Appl. No.: 666,123

[22] Filed: Oct. 29, 1984

Related U.S. Application Data

[63] Continuation of Ser. No. 533,820, Sep. 19, 1983, abandoned.

[30] Foreign Application Priority Data

Sep. 30, 1982 [CH] Switzerland ........................ 5748/82

[51] Int. Cl.[4] ........................ A23L 1/36

[52] U.S. Cl. ........................ 426/443; 426/634; 99/483

[58] Field of Search ........................ 426/457, 460, 443, 467, 426/634, 468

[56] References Cited

U.S. PATENT DOCUMENTS

| | | | |
|---|---|---|---|
| 3,868,469 | 2/1975 | Chalin | 99/534 X |
| 3,886,855 | 6/1975 | Nara | 99/516 X |
| 4,304,049 | 12/1981 | Curtius | 34/10 |
| 4,306,815 | 12/1981 | Majer et al. | 99/516 X |
| 4,330,411 | 5/1982 | Florin et al. | 210/769 |
| 4,438,681 | 3/1984 | Raboud et al. | 99/483 X |
| 4,534,992 | 8/1985 | Taguchi et al. | 426/457 |
| 4,543,264 | 9/1985 | Stahel | 426/467 |
| 4,556,573 | 12/1985 | Bartesch et al. | 426/467 |

OTHER PUBLICATIONS

Swern, 1979, Bailey's Industrial Oil and Fat Products, vol. 1, John Wiley & Sons, New York, pp. 271-272.

Inglett, 1972, Symposium: Seed Proteins, AVI Publishing, Westport, Ct., p. 238.

Markley, 1951, Soybeans and Soybean Products, vol. II, Interscience Publishers, New York, p. 571.

Scott et al, 1967, Food Technology, 21:1090.

Food Engineering, Aug. 1965, p. 15.

*Primary Examiner*—Raymond N. Jones

*Assistant Examiner*—Carolyn Paden

*Attorney, Agent, or Firm*—Robert A. Ostmann

[57] ABSTRACT

The method for the conditioning of crushed soya bean material for flocculation utilizes a fluidized bed installation with heat exchangers incorporated in a reaction chamber. The crushed bean material passes through the fluidized bed continuously, with a dwell time of 4 to 8 minutes, at a temperature of between 55° to 75° C.

10 Claims, 1 Drawing Figure

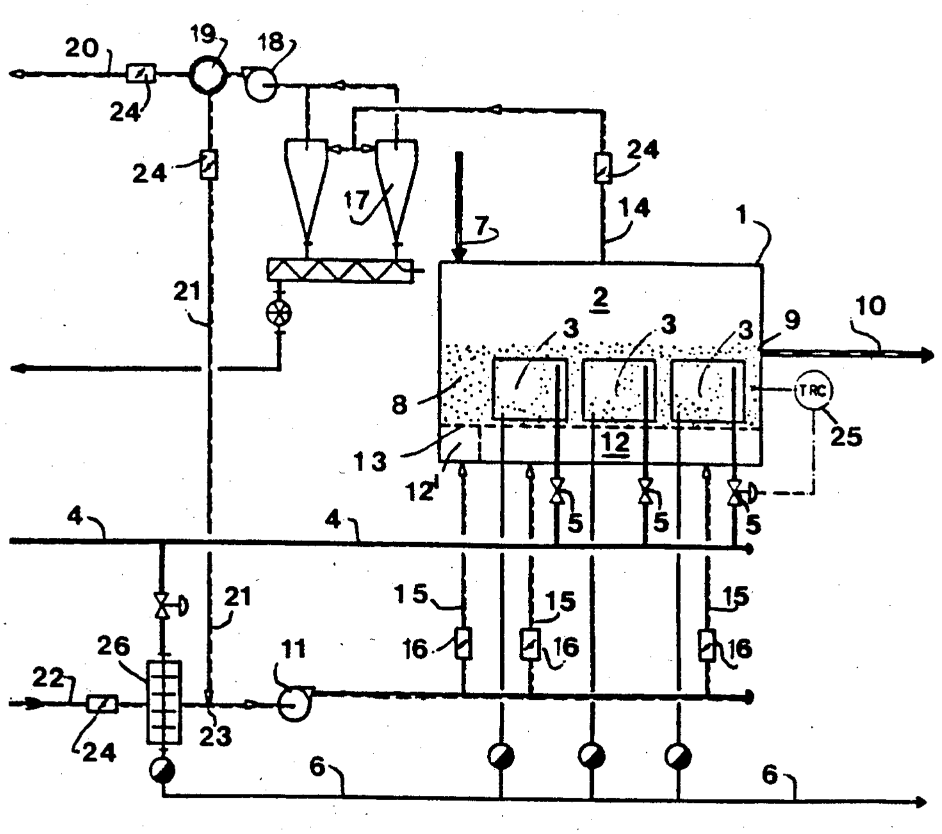
20
19
18
24
24
24
17
7
14
1
21
2
3
3
3
9
10
8
TRC
25
13
12'
12
4
4
5
5
5
21
15
15
15
26
16
16
16
11
22
24
23
6
6

PROCESS FOR THE CONDITIONING OF CRUSHED OIL-CONTAINING SEEDS PRIOR TO FLAKING

This application is a continuation of application Ser. No. 533,820, filed Sept. 19, 1983, now abandoned.

BACKGROUND OF THE INVENTION

The invention relates to an apparatus for the conditioning of oily seeds, in particular soya beans, which have previously been crushed and which after conditioning are to be flocculated.

In a method for processing soya beans, the latter are firstly crushed on grooved rolls in a processing stage, i.e. they are prepared into crushed bean material. Here the aim is to obtain 2 to 8 sub-particles from one bean, and to hereby produce the least possible proportion of fine particles. After crushing, the crushed beans pass through a conditioning stage, the aim of this conditioning stage, amongst other considerations, is to lower the viscosity of the oil enclosed in the cells by raising the bean temperature to 55° to 75° C. In addition, particular stress is laid on the homogeneous heating of the bean particles of the crushed material, so that the originally rather more hard crushed bean material becomes uniformly plastic and in the subsequent flocculation on smooth roll mills is such that on being rolled out forms stable flakes approximately 0.3 mm thin, in situ. At the same time, depending on the intial conditions, additional drying may be carried out. In any case, any surface humidity arising through heating should be dried away, otherwise after the flocculating rolls or during extraction, caking and agglomerations of the flakes occurs which causes transportation problems in conveying devices and percolation problems in the extractor.

In the methods conventional to date, usually steam tube apparatus, and more rarely plate apparatus, are used for the conditioning stage. Both types of apparatus have a relatively large reaction volume. This is due to the poor heat transfer between tubes or plates and the large heat transfer surfaces therefore required for heating. The product is fed mechanically through the apparatus. The large dimensions of these apparatus (20 m long) automatically result in a period of dwell of approximately 20 minutes, which has led the trade to regard this time as physically necessary for good conditioning. The mechanical transportation through the apparatus, on the other hand, can cause the product to be damaged and to be treated unhomogeneously. This unhomogeneous treatment can be improved by an extension of the period of dwell, which in turn led the trade to demand the apparatus to be designed with a long period of dwell.

Nevertheless, the results of the conditioning in these known apparatus, which are expensive in terms of construction and energy and which occupy a large amount of space, are not always satisfactory.

Despite the long period of dwell, not all the particles are homogeneously plastic and accordingly able to be well flocculated. A proportion remains or becomes brittle and is damaged by friction. The particles, at least partially, also have surface humidity. Owing to the long processing time, both the oily components and the components containing protein in the material which is to be treated are affected.

Owing to the poorly conditioned material, the subsequent flocculation mills are also affected. The partially hard material intially requires greater force in order to be rolled flat into flakes, which increases the expenditure in energy and in maintenance.

SUMMARY OF THE INVENTION

The object of the invention is to find an apparatus for the conditioning of the above-mentioned crushed soya material directly prior to or for flocculation, by which the conditioning can be carried out more economically than hitherto and with a totally satisfactory result, as regards the desired quality of the treated material.

Accordingly, the apparatus (a) is to be simpler, cheaper and nevertheless able to be better regulated and operated than those previously known, (b) is to enable the conditioning to be carried out with a small expenditure of energy, (c) is to yield a product in which the particles are treated homgeneously and without being damaged. i.e. they must be homogeneously plastic, not brittle and without surface humidity, with undamaged oily substances.

These requirements are fulfilled according to the invention in the apparatus of the type described in the introduction in that the apparatus has a fluidized bed installation, known per se, with heat exchangers incorporated in its reaction chamber, and which is designed to heat the crushed bean material continually passing through it, homogeneously at a dwell time of 4 to 8 minutes, to a temperature of the material of between 55° to 75° C., whilst the crushed beans, the material is substantially fluidised by air.

The apparatus can operate particularly economically if ducts are provided to carry at least a portion of the exhaust air leaving the fluidized bed installation back to fluidize the crushed bean material.

Surprisingly, in comparison with the assumptions made hitherto by the trade, it has been found that with the conditioning in the proposed apparatus, with substantially shorter periods of dwell, excellent conditioning results can be achieved, and also improvements were able to be attained with regard to other quality requirements:

Amongst others, this is to be understood to include a better protein digestibility owing to less coagulates or less non-hydratisable phosphatides. This enables an only reduced use of chemical adjuvants with a subsequent refining.

The improved conditioning of the crushed bean material, which according to the invention takes place under more economical conditions, both on the part of the apparatus and on the part of the energy which is to be used, leads for example to savings also in the subsequent flocculation. The homogeneously treated material can be more easily flocculated, whereby firstly saving on the energy which is to be used, and in addition the flocculating rolling mills are under less stress, which extends their serivce life or makes lighter constructions possible.

The apparatus takes up a relatively small space. Its further great advantage is its good operability: Once the apparatus is switched off, the material can remain in the fluidized bed installation, since it is without surface humidity, without any danger of possible agglomeration of the particles. On putting into operation again, the fluidisation can be begun again immediately.

The conditioning of the crushed beans takes place according to the invention in a fluidized bed installation with built-in heat exchangers. The heat exchangers are heated by steam and heat the product to the desired temperature. The high specific heat transfer coefficients achieved here enable the product to be supplied with the necessary energy by a heat exchanger surface of only 20% of a comparable pipe assembly conditioner. The reaction volume and the period of dwell connected therewith, i.e. 4 to 8 minutes, are only a fraction of what is usual. The strong turbulence of the product, however, produces a uniform heating of all particles, which are then able to be rolled out into stable flakes in the subsequent smooth rolls of the flocculating mills. This can even occur at lower temperatures than in conventional apparatus, because through the strong turbulence a more homogeneous treatment of the product results. The amount of air required for the fluidization is evenly distributed onto the in-flow surface through a special tuyere base. In this regard, the inflow base of the fluidized bend installation is equipped with nozzles, known per se, for the distribution of the air used for fluidization, and which prevent the disposition of particles in the nozzle area and hence prevent blockages in the base.

Throttling members in the connecting ducts serve to regulate the air. In addition, the air is largely conveyed in a circuit, to avoid energy losses. The dust removal takes place by way of high efficiency cyclones. The dust which is accumulated can be added to the finished treated product. To dry the undesired surface humidity which forms in the process a corresponding quantity of air is added to, or removed from, the process. Through the short period of dwell and the short diffusion time connected therewith, the drying is less than in known apparatus.

Any further intense drying which may be required is possible, without any problems, through increasing the quantity of exchange air. This quantity of air is drawn off as fresh air from the surroundings, is heated via a radiator by means of steam and is mixed with the recirculating air. The corresponding humidity-laden exhaust air is released into the environment via a flue.

The advantages of the process able to be carried out with the apparatus according to the invention, compared with conventional processes, are essentially that no moving machine parts come into contact with the product, i.e. the product is only transported by fluidization through the apparatus. However, this also means a very even heating of the product, which leads to excellent results. The method makes full use of the available energy. Through the direct heat transfer in the fluidized layer from the pipes to the product, energy is delivered to the product without loss. A loss of energy occurs only through the addition or removal of the energy required for drying, but this is minimal in comparison with other apparatus. The fluidization and the very homogeneous heating of the product particles make it possible to achieve good conditioning results at low temperatures, i.e. good flocculation of the beans. This short period at temperatures produces an improvement in oil quality. Through the better heat transfer coefficients in the fluidized bed, a smaller size of structure results, and hence a smaller space is required.

BRIEF DESCRIPTION OF THE DRAWING

The object of the invention will be described and elucidated in further detail below. The description refers to the drawing, the single FIGURE of which shows, diagrammatically, an example of an apparatus according to the invention.

DESCRIPTION OF THE PREFERRED EMBODIMENTS

The apparatus shown, for the conditioning of crushed soya bean material, has a fluidized bed installation 1, the reaction chamber 2 of which is heated by heat exchangers 3 incorporated therein. The heat exchangers are heated by steam passed via a steam conduit 4, which is regulated by valves 5. A condensate is passed out of the heat exchangers 3 to a condensate collecting pipe 6.

The crushed soya bean material which is to be conditioned,—the soya beans having been previously crushed, e.g. on grooved roll mills, into 2 to 8 sub-particles,—is fed continuously into the fluidized bed installation 1 via a duct 7. Here, the crushed material arrives into a material layer 8, in which it flows, fluidized, to an outlet 9, and is conditioned. The conditioned crushed soya bean material is passed via a duct 10 to the flocculating rolling mills, for flocculation.

The fluidization of the material layer 8 takes place by means of air, which is delivered from a ventilator 11 into a distribution box 12 of the fluidized bed installation, from which it flows through openings in the inflow base 13 into the material layer 8 and through the latter, and leaves the apparatus 1 via an exhaust air duct 14.

The fluidizing air is carried, for the purpose of better controllability, via several duct lines 15 into separate chambers in the distribution box 12, e.g. into the chamber designated by 12', whereby the current in the individual lines is regulated by means of throttling members 16. The fluidization of the material layer is thus regulated according to requirements along its flow through the fluidized bed apparatus.

The exhaust air which is to be removed from apparatus 1 via the duct 14 has a proportion of fine particles of fluidized crushed bean material and water vapour. The exhaust air duct 14 leads to high efficiency cyclones 17, where the fine particles are separated, and thereafter passed via a wheel sluice or airlock valve 17' and, for example, admixed to the conditioned crushed bean material prior to flocculation. The exhaust air, which is substantially freed of the fine particles by the cyclones, is carried by a second ventilator 18 to a divider 19, in which a portion of the exhaust air is released via a duct 20 into the atmosphere and in which the remaining exhaust air, which is substantially freed of the solid material particles, is carried via a duct 21 to the first ventilator 11 in order to be further used for the fluidization of the material layer 8 in the fluidized bed apparatus.

The fluidizing air is therefore carried in the circuit described, and only the proportion separated off into the atmosphere by the divider 19 needs to be replaced in terms of volume. This occurs through drawing off a corresponding volume of air from the atmosphere via a suction duct 22. In terms of temperature, this quantity of air can be adapted in a radiator 26 to the fluidizing air carried in the circuit, and is passed to and added to the latter at a mixing point 23.

Further throttling members provided in the ducts serve to regulate the installation, and are designated in the drawing in each case by 24. 25 designates a regulation of the heating of the heat exchangers 3 incorporated in the reaction chamber 2 of the fluidized bed apparatus 1, via valves 5.

The air which is returned into the circuit through the duct 21 carries with it a proportion of dust which is unavoidably not separated by the cyclones 17. For this reason, the inflow base 13 of the fluidized bed apparatus 1 is equipped with ring-gap nozzles known per se (Swiss Pat. No. 629 394 and Swiss Patent Application No. 5134/82), which prevent the disposition of dust particles on flowing through the base 13, and the disturbance to a regular fluidization thus caused.

In addition, the fluidized bed installation 1 characterizing the plant, as regards the structural design of its reaction chamber 2, the arrangement and design of the heat exchangers 3, their heating and the design of the fluidizing and charging of the apparatus with the crushed soya bean material which is to be conditioned, is laid out in the manner known to a specialist in the art such that the crushed soya material passes through the reaction chamber in a period of dwell of 4 to 8 minutes, whereby the material is brought homogeneously to a temperature of 55° to 75° C.

The divider 19 may also be constructed as a condenser for the water vapour which is to be separated off. The condensation heat thereby acquired could, for example, be used to heat the quantity of air to be added into the fluidizing air circuit.

The opinion is that this apparatus, designed for the conditioning of crushed soya bean material, would also be suitable for the conditioning of other types of seeds containing oil; for example, for the conditioning of cotton seeds. For this latter case, positive results and advantages of the brief and hence gentle thermal treatment are found, because despite the short period of dwell and of treatment, the material is treated homogeneously and is fully heated through at relatively low temperatures prevailing in the material layer. This gentle treatment takes place without damage to the oily components or those containing protein and leads to higher yield of oil and to better quality of oil. Furthermore, it was found after this treatment that the pigments present in the cotton seeds no longer cause a reddish discoloration to the oil was usually and undesirably obtained in previous conditioning methods. The quality of the oil obtained is therefore better in this respect. This is probably due to the fact that in the homogenous treatment taking place in the apparatus according to the invention, no seeds are overheated, which was previously repeatedly the case whereby the overheated pigments caused this discoloration and hence an impairment to the quality of the oil obtained.

We claim:

1. In a method for processing oil-containing seeds wherein the seeds are crushed, conditioned by heating to reduce the viscosity of the oil and render the crushed material plastic, and rolled to form thin flakes, the improvement wherein said heating step comprises forming a bed of said crushed material fluidized by warm air; transferring heat to the material in the bed by a heat exchanger located therein to thereby raise the temperature of the material to about 55° to 75° C.; and continuously moving the crushed material through the bed without mechanical agitation and with a residence treatment time of approximately 4 to 8 minutes.

2. Process according to claim 1 including recirculating exhaust air leaving the fluidized bed and using same to fluidize the crushed material again.

3. Process according to claim 2 including dividing the exhaust air leaving the fluidized bed into one stream which leads to the atmosphere, and a second stream which leads back to the fluidized bed.

4. Process according to claim 2 including mixing the recirculated exhaust air with fresh air extracted from the atmosphere.

5. Process according to claim 1 including heating the air which is used to fluidize the crushed material.

6. Process according to claim 5 including using steam to heat said air.

7. Process according to claim 1 including removing dust from exhaust air leaving the fluidized bed in cyclone apparatus.

8. Process according to claim 1 including introducing said warm air to the fluidized bed through nozzles in a base of the bed which prevent deposition of solids in the nozzle area.

9. Process according to claim 1 including using ventilators to both withdraw exhaust air from the fluidized bed and deliver warm air to that bed.

10. Process according to claim 1 including leading steam to and removing condensate from said heat exchanger.

* * * * *